G. HAYES.

Skylight Turret and Conservatory.

No. 8,689 Reissued April 29, 1879.

Witnesses:

George A. Hayes

Elizabeth Hopkins

Inventor.

George Hayes.

UNITED STATES PATENT OFFICE.

GEORGE HAYES, OF NEW YORK, N. Y.

IMPROVEMENT IN SKYLIGHT-TURRETS AND CONSERVATORIES.

Specification forming part of Letters Patent No. 143,153, dated September 23, 1873; Reissue No. 8,689, dated April 29, 1879; application filed January 21, 1879.

*To all whom it may concern:*

Be it known that I, GEORGE HAYES, of the city, county, and State of New York, have invented certain Improvements in Skylights, Conservatories, and other Glazed Structures, of which the following is a specification.

This invention consists in a combination, with hollow metallic flanged or rabbeted side posts or uprights, composed of reversely-arranged trough-shaped bars, constructed to receive the glasses, of flanged trough-shaped strips, arranged to straddle and stiffen the posts or uprights, likewise to hold the glasses in place, and to act as weather-strips.

The invention also consists in a novel construction of swinging sash, with an overlapping exterior flange, for the purpose of more effectually excluding rain and snow.

It further consists in the peculiar construction of the vertical posts, the manner of forming rabbets, and completing the joining of the two halves.

Figure 1:
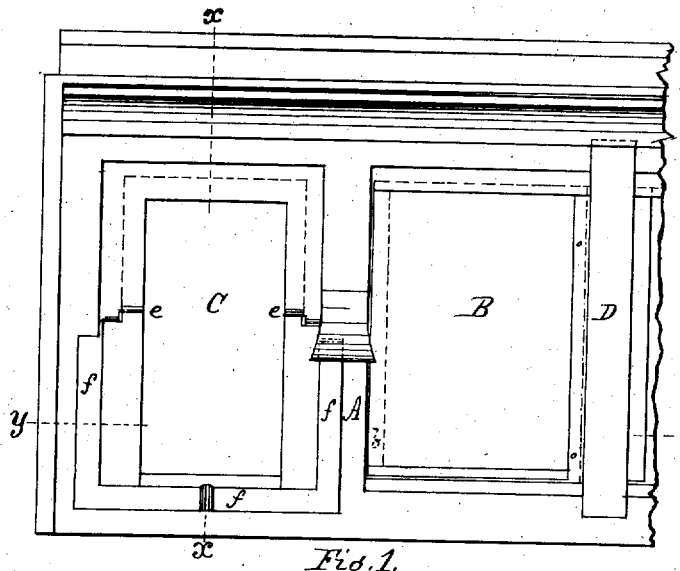
Figure 2:
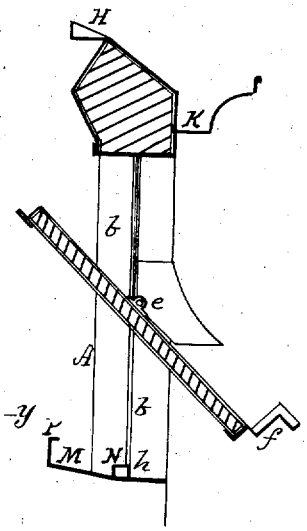
Figure 3:
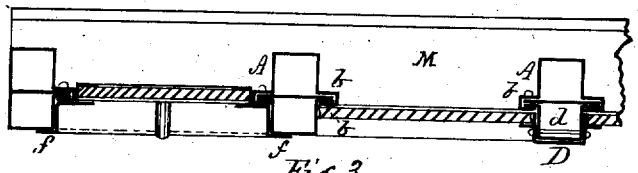

In the accompanying drawings, Figure 1 represents an outside face view of a turret-light, in part, with stationary and opening sashes constructed in accordance with my invention; Fig. 2, a vertical section on the line *x x;* and Fig. 3, a horizontal section on the line *y y*, Fig. 1.

Like letters indicate like parts.

A A represent the hollow metallic side posts or uprights, each composed of two trough-shaped bars, with flanges *b b* on opposite sides of them, said bars lying with their flanges against each other, the one flange being lapped and bent over the other, so as to secure straight-edged rabbets for the glass sashes to come against, also making a more perfect joint, being completely covered. Rivets passing through the same, if desired, complete the post.

A stiffening-plate may or may not be used, according to circumstances.

B is a stationary, and C a movable, sash. D is a flanged trough-shaped strip arranged to straddle and stiffen the post A, or such of them as receive the glasses of the stationary sashes, likewise serving to hold the glasses from falling out, and to act as weather-strips at the joints throughout the length of the posts. Said strips may be held in place by lapping under the upper molding and over the lower portion of the frame, and by one or more bolts, *d*, arranged to pass through them and the posts they straddle.

The swinging or movable sashes C, which rock on side bearings or pivots, *e*, are each constructed around their lower or outside opening portions with an overlapping exterior flange, *f*, which, when the sash is closed, shuts down or against the outside surface of the stationary portion of the structure or frame, and, in addition to the usual bearing, *h*, against which the sash closes, forms an elastic outer flashing, that serves most effectually to exclude rain or snow.

What I claim as new, and desire to secure by Letters Patent of the United States, is—

1. A post composed of sheet metal, in two halves, joined vertically, united by means of an overlapping flange on the one half and a receiving-flange on the other, so arranged that when the joint is completed a straight and rigid vertical rabbet is produced to receive glazed vertical sashes, and therewith produce a vertical wall for a conservatory, turret, or turret skylight, substantially as described and set forth.

2. The combination of flanged covering-strips D with the hollow metallic posts A, having flanges or rabbets *b b*, for the support of glasses, substantially as specified.

3. The swinging sashes C, provided with exterior and overlapping elastic flanges, *f*, essentially as described.

GEORGE HAYES.

Witnesses:

GEORGE A. HAYES,

ELIZABETH HOPKINS.